United States Patent [19]
Webster

[11] Patent Number: 5,477,322
[45] Date of Patent: Dec. 19, 1995

[54] SPECTROPHOTOMETER WITH LIGHT SOURCE IN THE FORM OF A LIGHT EMITTING DIODE ARRAY

[75] Inventor: Donald R. Webster, Laurel, Md.

[73] Assignee: NIRSystems Incorporated, Silver Spring, Md.

[21] Appl. No.: 322,556

[22] Filed: Oct. 13, 1994

[51] Int. Cl.⁶ .................................. G01J 3/28; G01J 3/10; G01J 3/32
[52] U.S. Cl. ........................... 356/328; 356/310; 250/553
[58] Field of Search .................................. 356/328, 310, 356/326, 329, 330–334, 305, 307, 73, 302, 432; 250/553

[56] References Cited

U.S. PATENT DOCUMENTS

| | | | |
|---|---|---|---|
| 5,029,245 | 7/1991 | Keranen et al. | 356/328 X |
| 5,040,889 | 8/1991 | Keane | 356/328 X |
| 5,257,086 | 10/1993 | Fateley et al. | 356/328 |

*Primary Examiner*—Vincent P. McGraw
*Assistant Examiner*—K. P. Hantis
*Attorney, Agent, or Firm*—Lane, Aitken & McCann

[57] ABSTRACT

In a spectrophotometer, a light source is provided in the form of a multiplicity of light emitting diodes which transmit light through an entrance slit to irradiate an oscillating grating. The light is dispersed by the grating toward an exit slit which transmits a narrow bandwidth of light to irradiate a sample. As the grating oscillates, the wavelength transmitted through the exit slit is scanned through a selected spectrum. The diodes in the array each emit light in a different wavelength band so that the diodes as a group emit light throughout the selected spectrum. As the grating oscillates, the diodes are energized and extinguished in sequence so that no more than two diodes will be energized at any given instant of time and the energized diode will be emitting light at the wavelength dispersed by the grating to the exit slit.

6 Claims, 2 Drawing Sheets

5,477,322

SPECTROPHOTOMETER WITH LIGHT SOURCE IN THE FORM OF A LIGHT EMITTING DIODE ARRAY

This invention relates to spectrographic analysis instruments and, more particularly, to a spectrographic analysis instrument of the type employing an oscillating or rotating grating.

BACKGROUND OF THE INVENTION

Spectrographic analysis particularly in the near infrared range is a powerful tool in analyzing substances and their properties. Infrared spectrographic analyzing instruments are used to measure the constituents of agricultural products and the composition and property of chemical substances. Spectrographic analysis instruments operating in the visible range also have important uses, for example, in analyzing and matching colors.

Typically, a spectrographic instrument employs a source of light having a wide spectral band extending over the spectral range of operation of the instrument. Light from the source is dispersed by the instrument into its spectral components and the dispersed spectral light is used in the analysis. The instrument of the type to which the present invention is directed employs an optical grating which is oscillated or rotated. Light from the source irradiates the optical grating through an entrance slit and the optical grating disperses the light into its spectral components toward an exit slit. A narrow wavelength band of light will pass through the exit slit. As the grating rotates or oscillates, the center wavelength of the light passing through the exit slit will vary throughout the range of the operating spectrum of the instrument. The wavelength transmitted through the exit slit at any given position of the grating will normally comprise a first order or primary center wavelength as well as second order and higher order wavelengths. This fact is used advantageously in some instruments to expand the wavelength band of the instrument, but it is also a problem because for analysis purposes, it is required that only a very narrow wavelength band of light be presented by the instrument. In addition, some stray light from the entrance slit will reflect off of other surfaces in the grating chamber and pass through the exit slit. To solve these problems, the instruments in the prior art and in current use employ order sorting filters to filter out the undesired wavelengths from the transmitted light. For example, in a near infrared instrument, the spectrum of interest usually ranges between 1100 nanometers and 2600 nanometers. When the grating of such an instrument is positioned so that it is transmitting light through the exit silt in the range of 2200–2600 nanometers of first order light, it will also be transmitting second order light in the range of 1100–1300 nanometers. Also, when the grating is in position to transmit light from 2200–1100 nanometers, it will also be transmitting second order light, outside the range of interest, from 1100 nanometers down to 550 nanometers. Order sorting filters are employed to filter out this unwanted light as well as to reduce the stray light passing through the exit slit. Because some of the second order light occurs within the band of interest, the order sorting filter must be changed to different positions of the grating. For an instrument employing a high speed oscillating grating, the filter must be changed at a rapid grate in synchronism with the grating oscillation. The need for the order sorting filters thus increases the complexity and cost of the instrument. Moreover, the order sorting filters are a source of attenuation and interference distortion of the light transmitted through the exit slit.

SUMMARY OF THE INVENTION

The system of the present invention provides a spectrophotometer with a high speed oscillating grating constructed to eliminate the need for the order sorting filters, and also stray light passing through the exit slit.

In accordance with the invention, an array of a multiplicity of light emitting diodes serves as the light source of the instrument. The light emitting diodes when energized each produce a relatively narrow bandwidth of light and the diodes of the array are selected to produce a different set of wavelength light distributed through the operative spectrum of the instrument. The wavelength band emitted by the diodes of the array are selected to overlap so that together the array produces a continuous spectrum of light extending over the operative spectrum of the instrument. Because each diode produces only a relatively narrow wavelength band and is separately energizable to either emit light or not emit light, the second and higher order wavelengths may be eliminated from the light source without the use of order sorting filters and, accordingly, can be eliminated from the narrow wavelength band components dispersed by the optical grating and transmitted through the exit slit. In addition, by energizing only one or two light emitting diodes at any given instant of time and synchronizing the energization of the light emitting diodes with the grating oscillating, the stray light passing through the exit slit can be greatly reduced.

DESCRIPTION OF A PREFERRED EMBODIMENT

Figure 1:
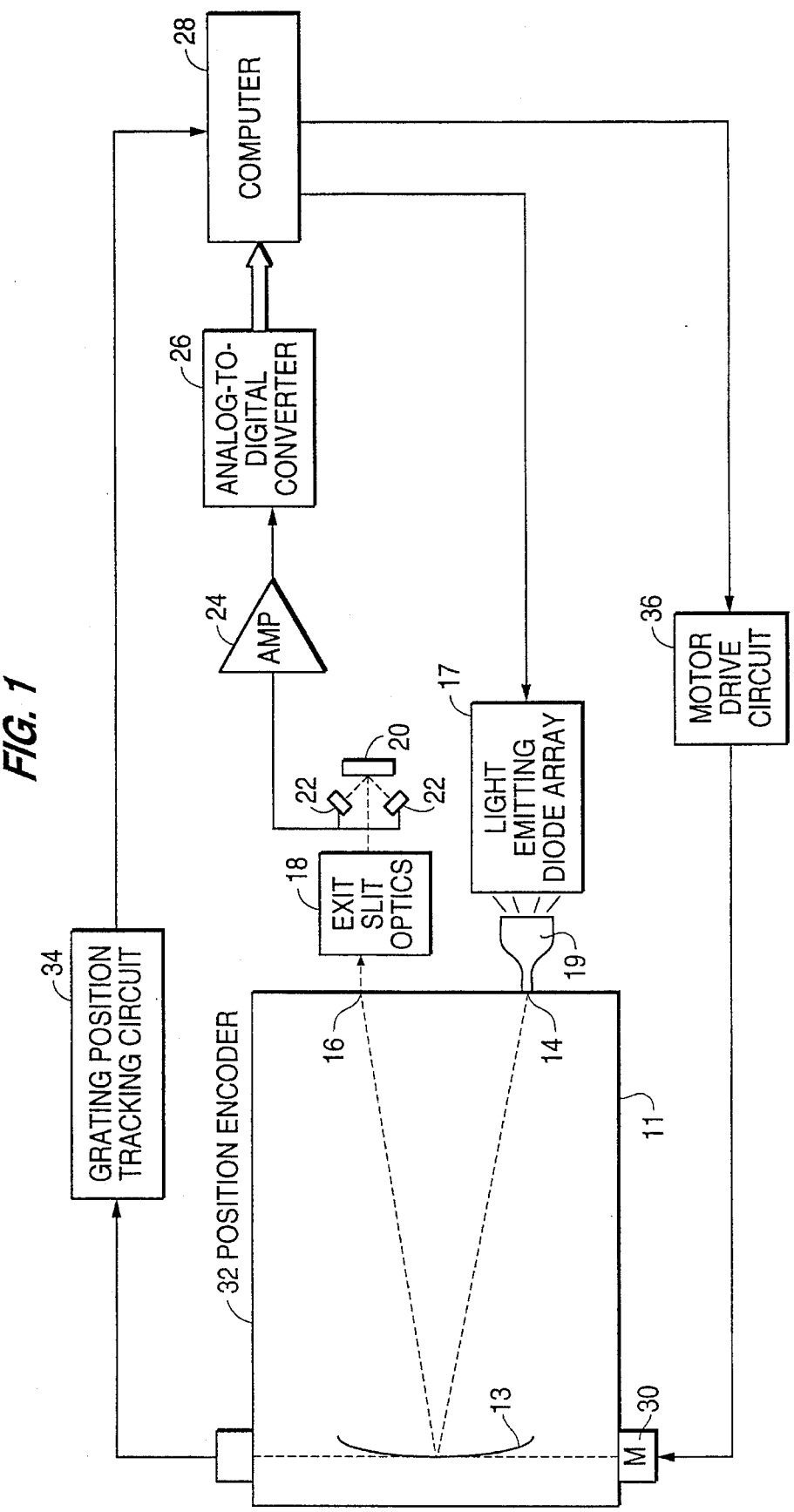
FIG. 1 schematically illustrates the system of the invention.
Figure 2:
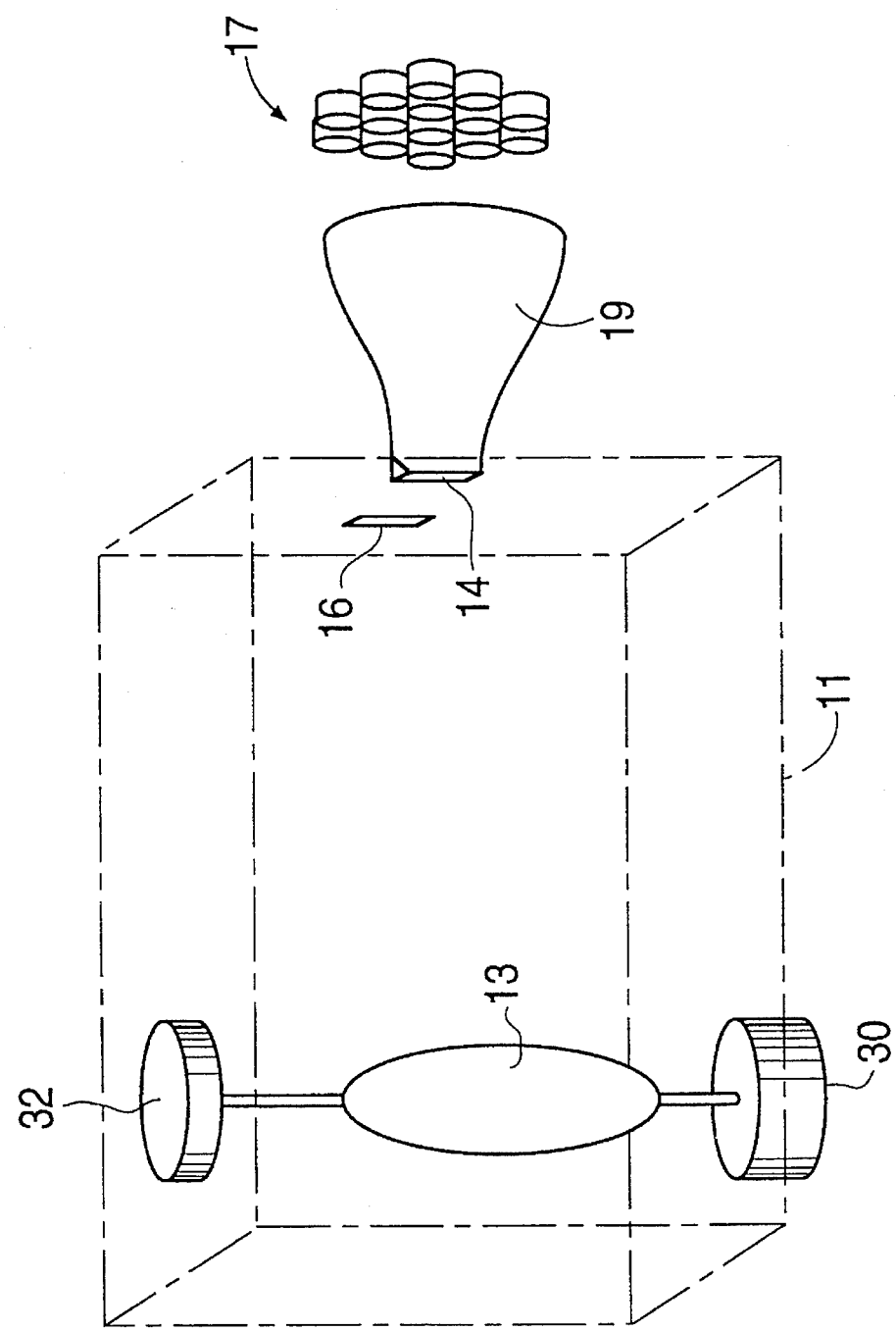
FIG. 2 is a schematic/isometric view of the assembly of the spectrophotometer and light emitting diode array of the present invention with the spectrophotometer chamber shown in phantom.

As shown in FIGS. 1 and 2, the system of the invention comprises a spectrophotometer 11 similar to the spectrophotometer disclosed in U.S. Pat. No. 4,969,739 to Philip A. McGee issued Nov. 13, 1990 which is hereby incorporated by reference. The spectrophotometer 11 has an optical reflecting grating 13 mounted for oscillation within a grating chamber. The grating is irradiated with light from an entrance slit 14 and reflects and disperses the received light into a spectrum extending over an exit slit 16, through which a narrow wavelength band of the spectrum passes. In accordance with the present invention, light is provided to the entrance slit 14 from an array of light emitting diodes 17. The light emitted by the light emitting diode array is received at the entrance ends of a fiber optic cable 19, which transmits the light to the entrance slit 14. The end of the fiber optic cable 19 at the entrance slit 14 is shaped into the shape of the entrance slit with the optic fibers distributed throughout the entrance slit. The end of the fiber optic cable 19 thus defines and comprises the entrance slit 14. The diodes in the light emitting diode array 17 are selected so that each diode transmits a different bandwidth with the bandwidth transmitted by each diode overlapping at the edge of its bandwidth with the bandwidth of another one of the diodes so that the diodes together transmit a continuous spectrum over the spectrum of interest for the spectrometer. In the preferred embodiment of the invention, the spectrometer is designed for use in infrared light and the spectrum of interest extends from 1100 nanometers to 2600 nanometers. Each of the diodes is designed to emit light over a bandwidth of about 100 nanometers. Accordingly, the diode transmitting the shortest wavelength light will transmit a bandwidth from 1100 nanometers to 1200 nanometers and the diode transmitting the longest wavelength light will transmit light extending from about 2500 nanometers to 2600 nanometers. The bandwidth transmitted by each diode will begin attenuating in intensity as the edge of the bandwidth is approached and the overlap between adjacent bandwidths is selected so that the point at which the curves representing intensity vs. wavelength cross is at about half the intensity at the center of the bandwidths. As a result, when two diodes transmitting adjacent bandwidths in the spectrum are energized simultaneously, the total intensity emitted by the two diodes energized simultaneously will add together to achieve a relatively constant bandwidth in the spectrum extending between the center wavelengths of the two adjacent bandwidths.

As the grating 13 oscillates, the wavelength of the narrow band passing through the exit slit is scanned through the spectrum. In the preferred embodiment, the width of the bandwidth passing through the exit slit is about 10 nanometers. The bandwidth passing through the exit slit 16 is received by exit slit optics 18 and directed onto a sample 20 to be analyzed. Light reflected from the sample 20 is detected by photodetectors 22 which generate an output signal having an amplitude corresponding in intensity of reflection from the sample at the wavelength currently being transmitted through the exit slit. The photodetector output signal is amplified by an amplifier 24 and successive samples of the amplifier output signal are converted to digital values by an analog-to-digital converter 26. The analog-to-digital converter 26 applies the digital values to a computer 28 in which the digital values are analyzed.

The grating 13 is driven in an oscillatory motion to oscillate the grating between limits by a motor 30 at a high rate preferably greater than 0.5 cycles per second and at a minimum of no less than 0.1 cycles per second. An encoder 32 is mounted on the motor shaft to produce output waveforms as the grating oscillates and indicative of the rotation of the grating. The waveforms produced by the encoder 32 are applied to grating position and tracking circuit 34 which maintains a count indicating the angular position of the grating. The operation of the encoder 32 and grating position tracking circuit 34 are described in more detail in U.S. Pat. No. 4,969,739. In response to the signals received from the tracking circuit 34, the computer 28 controls the energization of the light emitting diodes in the array 17 to energize the diodes in synchronism with the oscillation of the grating. As the grating oscillates, the computer 13 will energize the diodes in succession so that at any given time, only two diodes will be energized and these two diodes will correspond to those which are emitting light at the wavelength being dispersed and passing through the exit slit 16. As the grating passes through the center bandwidth of the bandwidth transmitted by a given diode, the computer will de-energize the diode transmitting the bandwidth which in the immediately preceding interval had been passing through the exit slit 16 and will energize the diode transmitting an adjacent bandwidth which will next pass through the exit slit. In this manner, the light emitted from the exit slit 14 will be limited to the 200 nanometers adjacent to or at the wavelength currently being transmitted through the exit slit 16. Accordingly, the need for order sorting filters is eliminated. In addition, the amount of stray light at the wrong wavelength passing through the exit slit 16 is also greatly reduced.

If the energization of the diodes were not controlled in synchronism with the grating 13, then when the grating is in the position scanning light in the wavelength from 2200 to 2600 nanometers, it would also be transmitting a second order light through the exit slit in the range of 1100 to 1300 nanometers if all the diodes in the array 17 were energized simultaneously. Since only the diodes emitting light in the range of 2200 to 2600 nanometers are energized at the time the grating is positioned to transmit this light through the exit slit 16, only light in this range is transmitted and the need for order sorting filters to prevent the transmission of the second order light is eliminated.

Within the grating chamber of spectrophotometer 11, some of the light from the entrance slit will reflect off the walls of the spectrophotometer and also the axle driving the grating 13 to reach the exit slit 16. By the synchronous energization of the diodes in the array 17 with the scan of the wavelength passing through the exit slit 16, the amount of this stray light passing through the exit slit 16 at the wrong wavelength is greatly attenuated. Moreover, since only two diodes are energized at any one time, the power requirements for energizing the diode array 17 are greatly reduced from a conventional broad band light source used in the prior art instruments.

As described above in the preferred embodiment, the diodes are energized sequentially in synchronism with the scanning of the wavelength through the exit slit 16. It will be apparent that the need for the order sorting filter could be eliminated simply by energizing the diodes in the array in two groups wherein the group transmitting the light at the long wavelength end of the spectrum is turned off when the grating is positioned to transmit the light at the short wavelength end of the spectrum and vice versa. For example, in the specific near infrared embodiment of the invention, the diode of the array 17 transmitting light in the range from 1100 to 1300 nanometers could be turned off while the grating is positioned to transmit the light in the upper end of the spectrum 2200 to 2600 nanometers and this would eliminate the need for the order sorting filters caused by the existence of second order light dispersed by the grating 13.

In addition, the second order light could also be eliminated by limiting the spectrum through which the grating is oscillated. As shown in FIG. 1, the computer 28 drives the motor 30 through a motor drive circuit 36 and through the motor drive circuit 36, the computer 287 can control and select the limits through which the grating is rotated. The details of the motor drive circuit are described in the above-mentioned U.S. Pat. No. 4,969,739. For example, the grating could be controlled to be oscillated just between the limits 1400 and 2600 nanometers and then could later be oscillated between limits covering the range 1200 to 1400 nanometers if readings from the sample in this range are also desired.

As described above, the light from the light emitting diode array 17 is received from each of the diodes in the array by all of the fibers of the cable 19. Alternatively, each diode could be arranged to transmit light solely to a separate bundle of fibers making up the cable 19 so that the light from each diode would be transmitted to the entrance slit through a separate group of optic fibers. In this arrangement, the fibers transmitting the light from each diode would be uniformly distributed throughout the entrance slit 14.

The above description of the invention is of a preferred embodiment thereof and many other modifications may be made to the invention without departing from the spirit and scope of the invention, which is defined in the appended claims.

I claim:

1. A spectrophotometer comprising an optical grating, means defining an entrance slit for said grating, a multiplicity of light emitting diodes arranged to irradiate said grating through said entrance slit so that light from each of said light emitting diodes irradiates said grating from the same angular position defined by said entrance slit, an exit slit parallel to said entrance slit positioned to transmit a narrow wavelength band of light dispersed by said grating, means to rotate said grating to scan the wavelength of the light transmitted through said exit slit through a selected spectrum, said light emitting diodes each generating a different wavelength band selected so that the multiplicity of light emitting diodes as a group emit light with wavelengths extending over said spectrum.

2. A spectrophotometer as recited in claim 1, further comprising means to energize and extinguish said light emitting diodes so that some of said diodes will be extinguished as said grating rotates to scan the wavelength in said selected spectrum and at least one diode emitting light in a wavelength transmitted through said exit slit will be energized.

3. A spectrophotometer as recited in claim 2, wherein said means to energize and extinguish said light emitting diodes energizes and extinguishes said light emitting diodes in sequence as said grating rotates.

4. A spectrophotometer as recited in claim 3, wherein said means to energize and extinguish said light emitting diodes controls the sequential energizing and extinguishing of said light emitting diode so that no more than two light emitting diodes are energized at any given instant of time.

5. A spectrophotometer as recited in claim 1, wherein the edges of adjacent bandwidths emitted by said light emitting diodes overlap.

6. A spectrophotometer as recited in claim 1, wherein said entrance slit is defined by a first end of a fiber optic bundle, the other end of said fiber optic bundle being positioned to receive the light emitted by said multiplicity of light emitting diodes.

* * * * *